United States Patent [19]

Bucher et al.

[11] Patent Number: 4,642,016

[45] Date of Patent: Feb. 10, 1987

[54] APPARATUS FOR UNLOADING NUCLEAR FUEL PELLETS FROM A SINTERING BOAT

[75] Inventors: George D. Bucher, McCondles, Pa.; Theodore E. Raymond, Sandy Run, S.C.

[73] Assignee: Westinghouse Electric Corp., Pittsburgh, Pa.

[21] Appl. No.: 637,371

[22] Filed: Aug. 3, 1984

[51] Int. Cl.[4] .............................................. B65G 65/34
[52] U.S. Cl. .................................... 414/421; 414/762; 414/354; 414/763
[58] Field of Search ................ 414/419, 421, 359-361, 414/763, 762, 354

[56] References Cited

U.S. PATENT DOCUMENTS

| | | | |
|---|---|---|---|
| 2,961,232 | 11/1960 | Holmberg et al. | 414/419 X |
| 3,269,571 | 8/1966 | McLearn et al. | 414/419 X |
| 3,274,845 | 9/1966 | Moran | 414/359 X |
| 3,709,386 | 1/1973 | Jones | 414/421 X |

Primary Examiner—Frank E. Werner

[57] ABSTRACT

A nuclear fuel pellet unloading apparatus includes a boat clamping and inverting mechanism which receives a boat loaded with pellets, clamps the boat and pivots it along an arcuate path adjacent a pellet transfer shroud from an initial upright position to a generally inverted position and then back to the upright position. As the loaded boat is pivoted, it progressively inverts next to an arcuate wall portion of the shroud which coacts to contain individual pellets as they begin to empty from the boat. The emptied pellets flow down the shroud to the next station. By the time the boat reaches its inverted position all of the pellets have emptied from the boat. The unloading apparatus also includes a pair of pneumatic cylinders which are selectively actuated for respectively delivering a loaded boat from a boat conveyor to the inverting mechanism and ejecting an empty boat from the inverting mechanism back to the boat conveyor.

10 Claims, 4 Drawing Figures

APPARATUS FOR UNLOADING NUCLEAR FUEL PELLETS FROM A SINTERING BOAT

BACKGROUND OF THE INVENTION

1. Field Of The Invention

The present invention relates generally to automated handling of nuclear fuel pellets during fabrication thereof and, more particularly, is concerned with an apparatus for unloading pellets from a sintering boat in a manner which provides gentle, but efficient, transfer of the pellets from one station to another in the fabrication process.

2. Description Of The Prior Art

Conventional practice in fabrication of nuclear fuel pellets requires transfer of pellets from station to station in the manufacturing process. Heretofore, transfer between certain stations has been performed manually. For instance, pellets are sintered in a furnace while stacked in large numbers in a boat, a square-shaped molybdenum container with an open top. Following the sintering station, the pellets must be unloaded from the boat and fed individually into a grinding station. Since the pellets are hard, abrasive and subject to chipping on impact and the molybdenum boat becomes brittle with continued service, it has been common practice to manually unload the boat by inverting it manually over the feeder bowl of the grinder station. Such procedure increases the exposure of personnel to the radioactivity of the pellets and airborne particles so that elaborate protective safeguards must be taken. Also, with several thousand pellets being contained in a single boat, the probability for chipping and otherwise damaging the valuable pellets is substantially increased.

Consequently, for quite some time, a need has existed for a technique to unload the nuclear fuel pellets from the sintering boat on an automated basis without the necessity for human intervention. Such technique must not only carefully handle the pellets to avoid chipping thereof, but must also gently handle the expensive, and oftentimes brittle, molybdenum sintering boat.

SUMMARY OF THE INVENTION

The present invention provides a nuclear fuel pellet unloading apparatus designed to satisfy the aforementioned needs. The technique underlying the present invention is a controlled, gradual tilting or pivoting of the loaded sintering boat and the placement of a transfer surface adjacent the boat. The boat is pivoted through an arcuate path from an upright position to an inverted position along the transfer surface. The transfer surface has a configuration corresponding to the arcuate pivotal path of the boat but is spaced from the boat path just enough to allow individual pellets, upon sliding through the open top of the boat as the boat pivots from its upright to inverted position, to slide down the surface past the boat and on to the next station. The automated pellet unloading operation can take place in a time frame which is compatible with the overall pace of the manufacturing operation. Also, the vertical transfer of the boat from a higher, upright loaded position to a lower, inverted empty position and then back to the higher upright position along the same arcuate path allows the apparatus to be relatively compact and efficient in the sapce it requires. As a result, only a relatively simple enclosure structure needs to be provided to limit personnel exposure and airborne contamination due to the pallet unloading operation.

Accordingly, the present invention is directed to an apparatus for unloading nuclear fuel pellets from a sintering boat having an open top which comprises: (a) means for receiving the boat in an upright position with the pellets contained therein; (b) means for clamping the boat; (c) means for transferring the clamped boat from the upright position to an inverted position and then back to the upright position; and (d) means for receiving the pellets from the clamped boat as the boat is being transferred from the upright position to the inverted position.

More particularly, the clamping and transferring means include a pair of boat supporting platform members which receive and support the boat between them and are movable relative to one another toward and away from each other for applying and releasing clamping forces to and from the boat. Then, with the boat clamped between them, the platform members are rotated together in a first direction and the boat is pivoted along an arcuate path from its upright position to its inverted position. Once the boat reaches its inverted position, it is pivoted back along the same path to its upright position. The pellet receiving means is a transfer shroud disposed adjacent to the pivotal path of the boat which has an upper arcuate wall portion extending generally parallel to the pivotal path and displaced therefrom a distance slightly greater than the thickness of an individual one of the pellets. Thus, as the boat moves from its upright position to its inverted position, individual pellets can slide relative to the clamped boat, through its open top, between the boat and the upper wall portion to the next station.

BRIEF DESCRIPTION OF THE DRAWINGS

In the course of the following detailed description, reference will be made to the attached drawings in which.

DETAILED DESCRIPTION OF THE PREFERRED EMBODIMENT

In the following description, right hand and left hand references are determined by standing at the rear of the apparatus and facing in the direction of the boat conveyor. Also, in the following description, it is to be understood that such terms as "forward," "left," "upward," etc., are words of convenience and are not to be construed as limiting terms.

IN GENERAL

Figure 1:
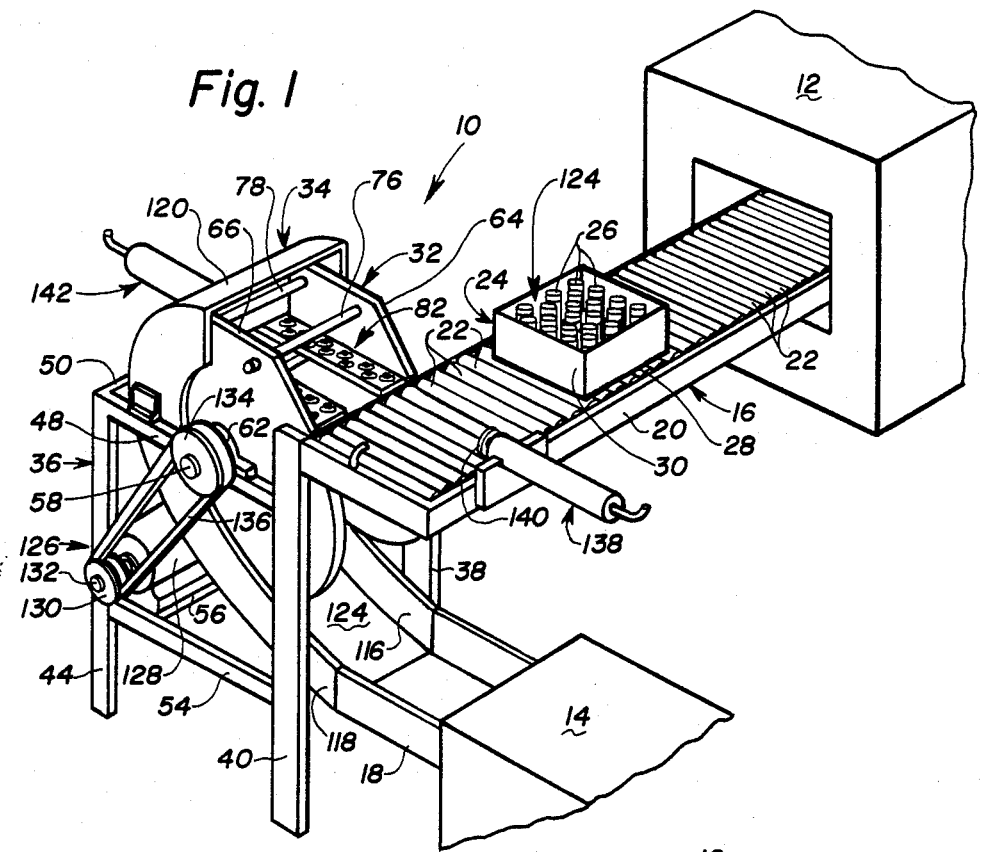
FIG. 1 is a perspective view of the pellet unloading apparatus of the present invention interposed between an upstream boat conveyor leading to and from a sintering furnace and a downstraam vibratory feeder leading to a grinder.

Referring now to the drawings, and particularly to FIG. 1, there is shown a pellet unloading apparatus, being indicated generally by numeral 10 and forming the preferred embodiment of the present invention. The apparatus 10 is located downstream of a pellet sintering furnace 12 and upstream of a grinder 14 in a nuclear fuel pellet production line. A boat conveyor 16 leads from the furnace 12 to the unloading apparatus 10 while a vibratory feeder 18 leads from the apparatus 10 to the grinder 14. The boat conveyor 16 includes a rectangular frame 20 mounting tandem rollers 22 which are powered by any suitable means (not shown) to move a boat 24 loaded with pellets 26 from the furnace 12 to the unloading apparatus 10 and then to move the empty boat from the apparatus 10 back to the furnace.

The boat 24 is preferably a molybdenum sintering boat fabricated as an open two-piece assembly which includes a sagger plate base 28 and a square side wall frame 30 attached to the base. The boat is expensive and becomes brittle with continued service. The boat emerges from the furnace 12 containing sintered uranium oxide nuclear fuel pellets 26, for instance, being stacked vertically on end in layers in a loose packed array on the base 28 of the boat 24. A typical boat might contain up to 5000 pellets. The pellets 26 are hard, abrasive and subject to chipping on impact. The surface and end conditions of the pellets are of primary importance, so an objective of the unloading apparatus 10 is not only to unload the pellets 26 from the boat 24, but to do so in a manner which avoids chipping or otherwise damaging the pellets as well as the boat. Thus, slow and gentle handling of the boat and pellets in the unloading thereof is a primary design consideration embodied by the apparatus 10.

PELLET UNLOADING APPARATUS

Figure 4:
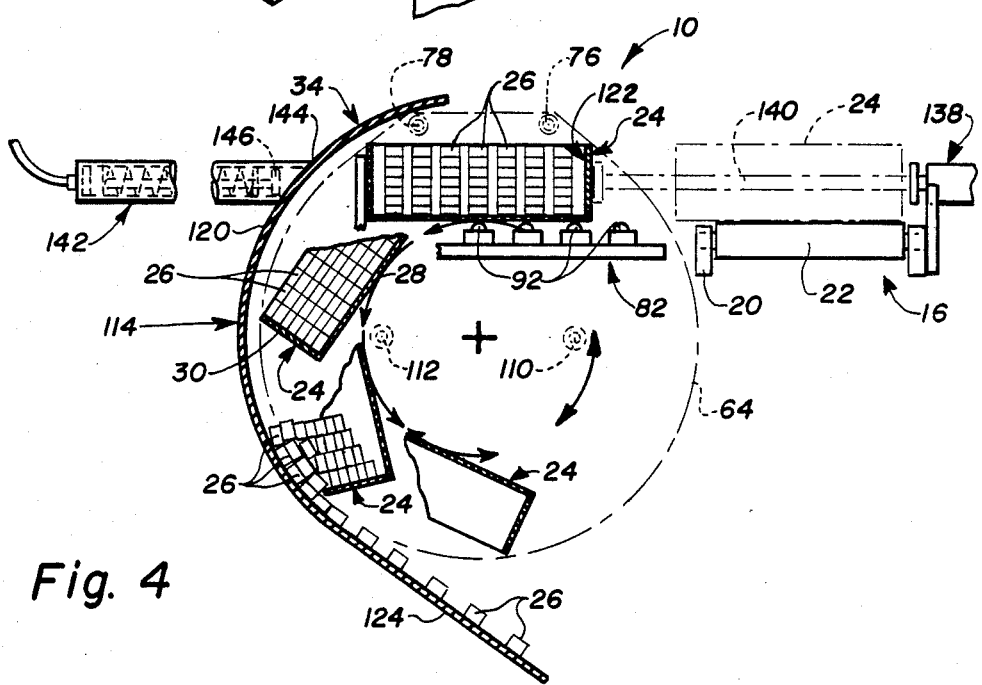
FIG. 4 is a schematical representation of sequential positions of the clamped boat as it is pivotally moved along an arcuate path from its initial upright position to its inverted position.
Figure 2:
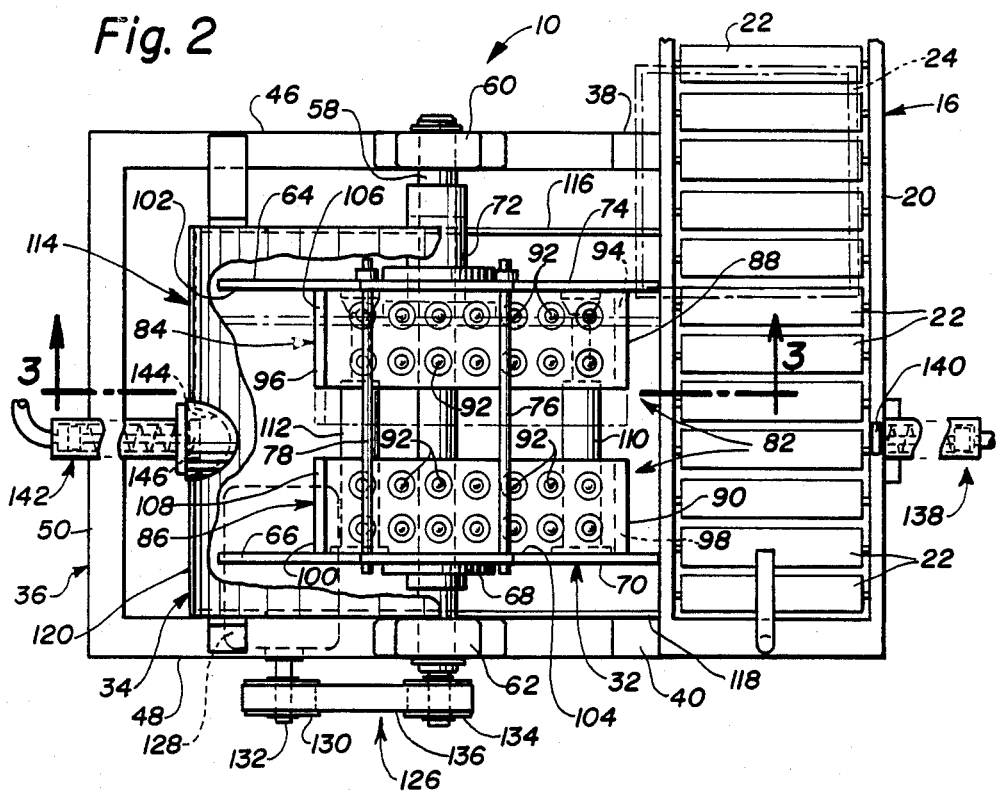
FIG. 2 is an enlarged top plan view of the pellet unloading apparatus of FIG. 1 disposed adjacent the boat conveyor, with a portion of a pellet transfer shroud of the apparatus broken away to expose its boat clamping and inverting mechanism.
Figure 3:
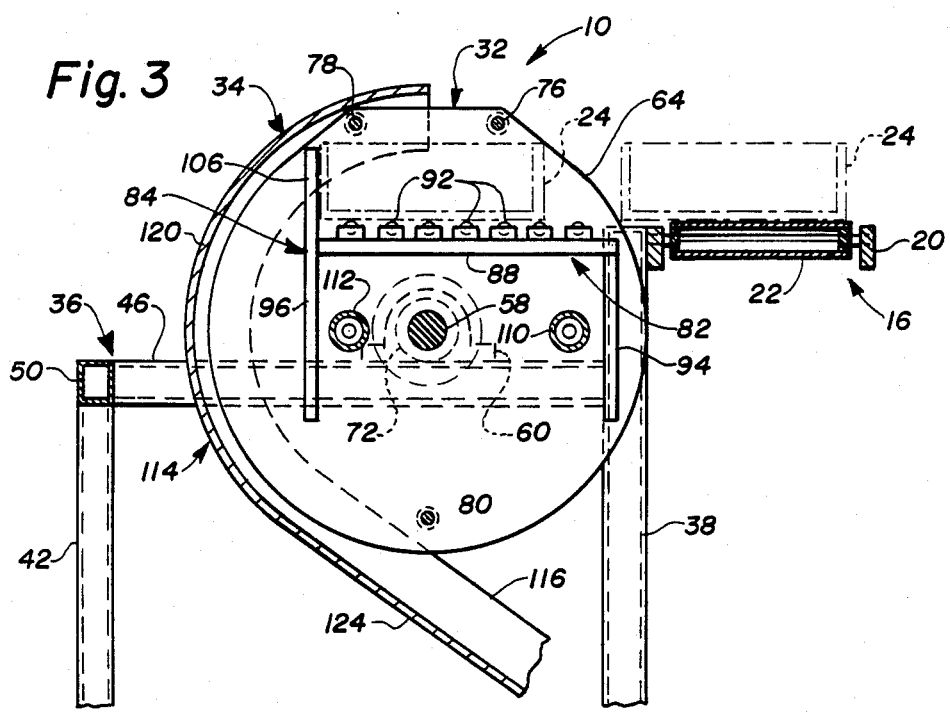
FIG. 3 is a sectional view of the pellet unloading apparatus as seen along line 3—3 of FIG. 2.

Turning also to FIGS. 2-4, as well as referring to FIG. 1, the pellet unloading apparatus 10 basically includes a boat clamping and inverting mechanism 32 disposed adjacent the boat conveyor 16 and a pellet transfer shroud 34 disposed adjacent the clamping and inverting mechanism 32. The mechanism 32 receives the loaded boat 24 in an upright position from the boat conveyor 16, clamps the boat 24, and pivots the clamped and loaded boat from its upright position to an inverted position, and then back to its upright position. As the boat 24 is pivoted, it progressively inverts next to the adjacently-disposed transfer shroud 34 which coacts to contain the pellets 26 as they begin to empty out of the boat 24. The emptied pellets 26 flow down the shroud 34 and drop into the vibratory feeder 18 which then feeds the pellets to the dry grinder 14.

The pellet unloading apparatus 10 further includes a base frame 36 which mounts the clamping and inverting mechanism 32 and the pellet transfer shroud 34. The frame 36 has a rectangular box-like configuration formed by a pair of forward upright spaced-apart corner legs 38,40 and a pair of rear upright spaced-apart corner legs 42,44. The forward corner legs 38,40 also serve to support the boat conveyor 16. A pair of upper side cross beams 46,48 extend between and interconnect corresponding forward and rear corner legs 38,42 and 40,44 at the upper ends thereof, while a single upper rear cross beam 50 extends between and interconnects the rear corner legs 42,44 at upper ends thereof. Likewise, a pair of intermediate side cross beams 54 extend between and interconnect corresponding forward and rear corner legs 38,42 and 40,44 at locations spaced upwardly from the lower ends thereof, while a single intermediate rear cross beam 56 extends between and interconnects the intermediate side cross beams 54 at locations spaced a short distance forwardly of their connections with the rear corner legs 42,44. Other lower side and rear cross beams interconnecting the upright corner legs are not shown.

The boat clamping and inverting mechanism 32 includes a central shaft 58 mounted for rotation about a generally horizontal axis by a pair of bearings 60,62 attached to the top surfaces of the pair of upper side cross beams 46,48 and located intermediately between the ends of the beams. A pair of generally circular left and right side plates 64,66 are mounted in axially spaced-apart relationship along the central shaft 58. The right side plate 66 is attached to the central shaft 58 at a fixed location adjacent to and inwardly from the right bearing 62 on the upper side cross beam 48 by a cylindrical hub 68 interconnecting the shaft 58 and the right side plate 66 on its outer surface 70. On the other hand, the left side plate 64 is mounted for axial slidable movement along the central shaft 58 by a cylindrical sleeve 72, such as a Thomson ball bushing, inserted on the shaft 58 and attached to the outer surface 74 of the left side plate.

The left side plate 64 is additionally supported for axial movement along the shaft 58 by a pair of spaced apart upper tie rods 76,78 and a single lower tie rod 80 which extend between the left and right side plates 64,66. At their right ends, the tie rods 76,78,80 are rigidly attached to the right side plate 66, while at their left ends they extend through the left side plate 64 such that the latter can slide along the tie rods as it slides along the shaft 58.

The boat clamping and inverting mechanism 32 further includes a boat supporting platform 82 having left and right portions 84,86. Each of the platform portions 84,86 has a base 88,90 with ball casters 92 mounted on its upper surface and a pair of fore and aft brace plates 94,96 and 98,100 connected at right angles to the base 88,90. The platform portions 84,86 are disposed side-by-side with their corresponding bases 88,90 and brace plates 94,96 and 98,100 aligned in common planes and attached to respective inner, facing surfaces 102,104 of the left and right side plates 64,66. The fore brace plates 94,98 completely underlie their respective bases 88,90, while the aft brace plates 96,100 have upper end portions 106,108 which extend upwardly past the rear ends of the bases 88,90 and function to limit movement of the boat 24 in a rearward direction when the boat is supported on the bases of the platform 82. Since the right platform portion 86 is attached to the right side plate 66, it remains at a stationary position along the central shaft 58. However, since the left platform portion 84 is attached to the left side plate 64, it moves with the left side plate 64 as the latter moves axially along the shaft 58 and tie rods 76,78,80.

Finally, for moving the left side plate 64 and its platform portion 84 toward and away from the stationary right side plate 66 and its platform portion 86, the boat clamping and inverting mechanism 32 includes a pair of actuators 110,112, preferably in the form of a pair of pneumatic cylinders. The actuators 110,112 are located below the respective platform portion bases 88,90 and between respective fore and aft brace plates 94,96 and 98,100. The actuators 110,112 extend between left and right side plates 64,66 and are anchored at their cylinder ends to the right side plate 66 while being attached at their piston rod ends to the left side plate 64.

When a boat 24 is supported on the platform portion bases 88,90, retraction of the actuators 110, 112 moves the left side plate 64 toward the right side plate 66 and imposes side clamping forces on the boat 24 which clamps the boat on the platform 82 between the inner surfaces 102,104 of the left and right side plates 64,66. With forward movement of the boat 24 limited by the upper end portions 106,108 of the platform portion aft brace plates 96,100, the boat 24 is secured to the platform 82 such that it cannot move relative thereto or separate therefrom during rotation of the boat clamping and inverting mechanism 32 and inversion of the boat 24. On the other hand, extension of the actuators 110,112 releases the side clamping forces on the boat 24.

As mentioned earlier, when the boat 24 is clamped on the platform 82 of the clamping and inverting mechanism 32 and the latter is rotated in a counterclockwise direction as seen in FIG. 4, the boat progressively inverts next to the adjacently-disposed transfer shroud 34 which coacts to contain the pellets 26 as they begin to empty from the boat 24. The emptying pellets flow down the shroud and drop into the vibratory feeder 18 which then feeds them to the dry grinder 14. For containing the pellets 26 as they begin emptying from the boat 24, the transfer shroud 34 includes a bottom wall 114 and a pair of side walls 116,118 attached to opposite lateral edges of the bottom wall. The side walls prevent the pellets from falling off lateral sides of the bottom wall.

The shroud bottom wall 114 has an upper arcuate-shaped portion 120 disposed generally parallel to the arcuate path of pivotal movement of the boat 24, as seen in FIG. 4, but displaced from the boat's pivotal path through a distance slightly greater than the thickness of an individual one of the pellets 26. Thus, upon counterclockwise pivotal movement of the boat 24, the pellets therein can slide relative to the clamped boat, through its open top 122, downward between the boat and the upper bottom wall portion 120, past the boat and along the wall portion, and in doing so empty individually from the boat 24. The shroud bottom wall 114 also has a lower generally flat or linear portion 124 which merges from the upper wall portion 120 and leads away from the arcuate pivotal path of the boat 24, as can be seen in FIG. 4. The lower wall portion 124 receives individual pellets 26 which have unloaded from the boat 24 onto the upper wall portion 120 and slide down the upper wall portion 120, past the boat 24 to the lower wall portion 124. The lower bottom wall portion thus guides the flow of individual pellets from the boat to the vibratory feeder 18.

In the preferred embodiment of the pellet unloading apparatus 10, the boat 24 is pivoted from its upright position to an inverted position and then back to its upright position as the clamping and inverting mechanism 32 is rotated first counterclockwise and then clockwise through the same arcuate path. For powering the clamping and inverting mechanism 32 through its rotary movement, the apparatus 10 includes drive means 126 mounted on the base frame 36 and drivingly coupled to the central shaft 58 of the mechanism 32. The drive means 126 includes a reversible electric motor 128 mounted on the intermediate cross beam 56 of the frame 36. A drive pulley 130 attached on the drive shaft 132 of the motor 128 is aligned with a driven pulley 134 mounted on the right end of the central shaft 58, and a drive belt 136 extends about and drivingly couples the two pulleys 130,134. Thus, by actuating the motor 128 so that its drive shaft 132 rotates in a counterclockwise direction, the inverting mechanism 32 is rotated counterclockwise for unloading the boat 24. Then, by actuating the motor 128 so that its drive shaft 132 rotates in a reverse, clockwise direction, the inverting mechanism 32 is rotated clockwise to return the empty boat 24 to its initial upright position for transfer back to the boat conveyor 16.

Finally, the pellet unloading apparatus 10 includes means for transferring the boat 24 to and from the upright position on the platform 82 of the clamping and inverting mechanism 32. For delivering the loaded boat 24 from the end of the boat conveyor 16, an actuator in the form of a pneumatic cylinder 138 is disposed adjacent to the inverting mechanism 32, being mounted to the boat conveyor frame 20 on a side thereof opposite to the location of the mechanism 32. Actuation of the boat delivering cylinder 138 causes extension of its piston rod 140 which engages the boat 24 and pushes it onto the platform 82 of the inverting mechanism 32. Retraction of the piston rod 140 then clears the space overlying the end of the boat conveyor 16 so that the boat 24 when empty can be returned to the conveyor 16. For ejecting the empty boat 24 from the inverting mechanism 32, an actuator in the form of a pneumatic cylinder 142 is disposed adjacent to the inverting mechanism 32 but in an opposing relationship from the other actuator 138. The boat ejecting cylinder 142 is mounted to the rear side of the pellet transfer shroud 34 on the upper wall portion 120 thereof so as to extend through an opening 144 defined therein. The cylinder 142 has a piston rod 146 which is extendible and retractible along a path aligned with the path of movement of the piston rod 140 of the boat delivering cylinder 138, and also aligned with the space between the upper end portions 106,108 of the aft brace plates 96,100 of the boat supporting platform 82. Thus, actuation of the boat ejecting cylinder 142 causes extension of its piston rod 146 which engages the empty boat 24 and pushes it from the platform 82 of the inverting mechanism 32 and onto the boat conveyor 16. Retraction of its piston rod 146 clears the platform area of the inverting mechanism 32 for subsequent delivery of another loaded boat.

It is readily apparent that the pellet unloading apparatus 10 includes controls (not shown) by which the desired coordinated operations of the boat delivering and ejecting cylinders 138,142 and the boat clamping and inverting mechanism 32 can be carried out. Operation of the cylinders 138,142 and electric motor 128 can be controlled by an operator or, alternatively, sensors could be provided to control operation thereof. For instances, sensors can be placed along the entrance to the unloading apparatus 10 to signal the controls when a loaded boat has arrived at the entrance for actuating the boat delivering cylinder 138 to push the loaded boat onto the platform 82 of the inverting mechanism 32. Also, sensors can be placed along the shroud 34 adjacent the platform 82 of the inverting mechanism 32 to signal the unloading apparatus controls when the loaded boat has been received on the platform 82 for initiating operation of the inverting mechanism 32 to start its boat unloading cycle and to signal the controls when the empty boat has returned to its upright position at the end of the return cycle of the inverting mechanism 32 for initiating operation of the boat ejecting cylinder 142 to push the empty boat onto the boat conveyor 16. Finally, sensors can be placed along the shroud 34 adjacent the inverting mechanism 32 to signal the unloading apparatus controls when the inverting mechanism has reached the end of its unloading cycle for initiating reverse rotation of the motor 128 for return of the empty boat to its upright position.

Protective enclosures (not shown) are provided for the boat conveyor 16, the grinder feeder 18 and the pellet unloading apparatus 10 to limit personnel exposure to the pellets 26 and any airborne contamination. Also, an exhaust ventilation system would be provided in communication with the enclosures.

It is thought that the present invention and many of its attendant advantages will be understood from the foregoing description and it will be apparent that various changes may be made in the form, construction and arrangement of the parts of the apparatus described without departing from the spirit and scope of the invention or sacrificing all of its material advantages, the form hereinbefore described being merely a preferred or exemplary embodiment thereof.

We claim:

1. Apparatus for unloading nuclear fuel pellets from a sintering boat having an open top, comprising:
    (a) a base frame;
    (b) a boat clamping and inverting mechanism including
        (i) a shaft mounted for rotation about a generally horizontal axis on said frame,
        (ii) a pair of boat supporting and clamping platform members mounted in axially spaced apart relationship along said shaft for receiving and supporting said boat therebetween, one of said members being attached to said shaft and the other of said members being slidable along said shaft toward and away from said one member for applying and releasing clamping forces to and from said boat supported between said members, and
        (iii) actuator means disposed between and interconnecting said boat supporting and clamping platform members and operable to slide said other of said members toward and away from said one member;
    (c) power means mounted on said base frame and drivingly coupled to said shaft for rotating said shaft and said boat supporting and clamping platform members therewith in a first direction and pivoting said boat when clamped between said members along an arcuate path from an upright position to an inverted position, said power means also for rotating said shaft and said boat supporting and clamping platform members therewith in a second direction and pivoting said boat along said arcuate path from said inverted position back to said upright position; and
    (d) a pellet transfer shroud disposed adjacent said boat clamping and inverting mechanism including
        (i) an arcuate upper wall portion disposed generally parallel and adjacent to said arcuate path of pivotal movement of said boat and displaced from said path through a distance slightly greater than the thickness of an individual one of said pellets such that said pellets in said boat can slide relative to said clamped boat, through its open top, between said boat and said upper wall portion, past said boat and onto and along said upper wall portion as said boat is pivoted along said arcuate path from its upright position toward its inverted position, and
        (ii) a lower wall portion merging from said upper wall portion and leading away from said arcuate pivotal path of said boat for receiving individual pellets unloaded from said boat onto said upper wall portion.

2. The pellet unloading apparatus as recited in claim 1, further comprising:
    (e) boat transfer means including
        (i) a first actuator disposed adjacent one side of said boat clamping and inverting mechanism and being extendible for pushing said boat with a stack of pellets loaded therein into said upright position between said boat supporting and clamping platform members of said mechanism, and
        (ii) a second actuator disposed adjacent an opposite side of said boat clamping and inverting mechanism and being extendible for pushing said boat emptied of pellets from between said boat supporting and clamping platform members.

3. The pellet unloading apparatus as recited in claim 2, wherein said second actuator is mounted to said upper wall portion of said pellet transfer shroud and is extendible through an opening formed in said upper wall portion.

4. Apparatus for unloading nuclear fuel pellets from a loaded sintering boat having an open top, comprising:
    (a) means for receiving said boat in an upright position with said pellets contained therein, said boat receiving means including a platform for supporting said loaded boat in said upright position, said boat supporting platform having first and second portions;
    (b) means for clamping said boat including a pair of plates disposed at lateral sides of said boat and being movable in a first direction relative to one another for applying clamping forces to said boat on said platform and in a second direction relative to one another for releasing said clamping forces from said boat, said pair of plates having inner surfaces facing toward one another, said first and second platform portions of said boat supporting platform being mounted to said plates on said respective facing surfaces thereof and disposed in a common plane, one of said plates and the one of said platform portions mounted thereto being disposed in a stationary position and the other of said plates and the other of said platform portions mounted thereto being movable relative thereto in said first and second directions for applying and releasing clamping forces to and from said boat while said boat is supported in said upright position by said platform portions;
    (c) means for transferring said clamped boat from said upright position to an inverted position and then back to said upright position; and
    (d) means for receiving said pellets from said clamped boat as said boat is being transferred from said upright position to said inverted position.

5. The pellet unloading apparatus as recited in claim 4, further comprising:
    (e) means for delivering said loaded boat in said upright position to said boat receiving means; and
    (f) means for ejecting said boat from said boat receiving means.

6. The pellet unloading apparatus as recited in claim 5, wherein:
  said boat delivering means includes an actuator disposed adjacent said boat receiving means and being extendible for pushing said loaded boat to said boat receiving means; and
  said boat ejecting means includes another actuator disposed adjacent said boat receiving means opposite from said one actuator and being extendible for pushing said boat from said boat receiving means.

7. The pellet unloading apparatus as recited in claim 4, wherein:
  said boat clamping means includes means disposed between and connected to said pair of plates and being actuatable for moving said other plate in said first and second directions toward and away from said one plate.

8. The pellet unloading apparatus as recited in claim 4, wherein said boat transferring means includes:
  a shaft mounting said pair of plates for rotation in a third direction for pivoting said clamped loaded boat along an arcuate path from its upright position to its inverted position and for rotation in a fourth direction for pivoting said clamped unloaded boat along said path from its inverted position back to its upright position; and
  power means coupled to said shaft for causing rotation of said shaft and plates in said third and fourth directions.

9. Apparatus for unloading nuclear fuel pellets from a loaded sintering boat having an open top, comprising:
  (a) means for receiving said boat in an upright position with said pellets contained therein, said boat receiving means including a platform for supporting said loaded boat in said upright position;
  (b) means for clamping said boat including a pair of plates disposed at lateral sides of said boat and being movable in a first direction relative to one another for applying clamping forces to said boat on said platform and in a second direction relative to one another for releasing said clamping forces from said boat, said pair of plates having inner surfaces facing toward one another, said first and second platform portions of said boat supporting platform being mounted to said plates on said respective facing surfaces thereof and disposed in a common plane, one of said plates and one of said platform portions mounted thereto being disposed in a stationary position and the other of said plates and the other of said platform portions mounted thereto being movable relative thereto in said first and second directions for applying and releasing clamping forces to and from said boat while said boat is supported in said upright position by said platform portions;
  (c) means for transferring said clamped boat along an arcuate path from said upright position to an inverted position and then back to said upright position; and
  (d) means for receiving said pellets from said clamped boat as said boat is being transferred along said arcuate path from said upright position to said inverted position, said pellet receiving means including a bottom wall having
    (i) an arcuate upper portion disposed generally parallel and adjacent to said arcuate path of said loaded boat and displaced from said path through a distance slightly greater than the thickness of an individual one of said pellets such that said pellets in said boat can slide relative to said clamped boat, emptying through its open top, between said boat and said upper bottom wall portion, past said boat and onto and along said upper bottom wall portion as said boat is transferred along said path from its upright position toward its inverted position, said emptying of said pellets starting before said boat reaches its inverted position, and
    (ii) a lower portion merging from said upper portion and leading away from said arcuate path of said boat for receiving individual pellets unloaded from said boat onto said upper portion;
  (e) said pellet receiving means further including a pair of side walls attached to opposite lateral edges of said upper and lower bottom wall portions for preventing individual pellets being unloaded from said boat from falling off said lateral edges of said bottom wall.

10. The pellet unloading apparatus as recited in claim 9, wherein said boat transferring means includes:
  a shaft mounting said pair of plates for rotation in a third direction for pivoting said clamped loaded boat along said arcuate path from its upright position to its inverted position and for rotation in a fourth direction for pivoting said clamped unloaded boat along said path from its inverted position back to its upright position; and
  power means coupled to said shaft for causing rotation of said shaft and plates in said third and fourth directions.

* * * * *